United States Patent [19]

Sevier

[11] Patent Number: 4,797,214

[45] Date of Patent: Jan. 10, 1989

[54] METHOD OF TREATMENT OF WASTE STREAMS OF OIL/WATER EMULSIONS OR SOLUTIONS

[75] Inventor: David C. Sevier, Branford, Conn.

[73] Assignees: Vincent Saputo; Lorraine Saputo, both of Branford; Charles Blaha, Killingworth; Paul Orsino, East Haven; Accu-Lab, Inc., Branford, all of Conn. ; part interest to each

[21] Appl. No.: 70,869

[22] Filed: Jul. 7, 1987

[51] Int. Cl.$^4$ .............................................. B01D 17/05
[52] U.S. Cl. ..................................... 210/651; 210/708; 210/727; 252/329; 252/358
[58] Field of Search ................ 208/180, 181; 210/651, 210/708, 724–728, 734; 252/329, 344, 358

[56] References Cited

U.S. PATENT DOCUMENTS

| | | | |
|---|---|---|---|
| 3,350,301 | 10/1967 | Hoffman | 210/708 |
| 3,446,732 | 5/1969 | Gasser | 210/708 |
| 3,707,464 | 12/1972 | Burns et al. | 210/712 |
| 3,756,959 | 9/1973 | Vitalis et al. | 210/708 |
| 3,956,117 | 5/1976 | Bradley et al. | 210/708 |
| 3,974,069 | 8/1976 | Nettli | 210/737 |
| 4,026,794 | 5/1977 | Mauceri | 210/708 |
| 4,179,369 | 12/1979 | Bradley et al. | 210/708 |
| 4,332,686 | 6/1982 | Gerlach et al. | 210/708 |
| 4,425,238 | 1/1984 | Degen | 210/666 |
| 4,456,534 | 6/1984 | Lambert et al. | 210/725 |

FOREIGN PATENT DOCUMENTS

| | | | |
|---|---|---|---|
| 2313217 | 3/1973 | Fed. Rep. of Germany | 210/708 |
| 48-44336 | 12/1973 | Japan | 210/708 |
| 49-132855 | 12/1974 | Japan | 210/708 |

*Primary Examiner*—Peter Hruskoci
*Attorney, Agent, or Firm*—DeLio & Associates

[57] ABSTRACT

A process for treating an emulsion or solution of water and oil or the like comprising the steps of (a) contacting said emulsion or solution with an inorganic salt; (b) contacting said emulsion or solution with a synthetic polyelectrolyte flocculant; and, after steps (a) and (b), contacting said emulsion or solution with a demulsifying agent whereby said emulsion or solution is split into separate oil and water phases for subsequent separation. Preferably the salt is sodium chloride, the flocculant is an anionic synthetic flocculant having a molecular weight of six to eight million and a charge of three (3), and the demulsifying agent is sulfuric acid. The process may be used with emulsions or solutions which have previously been processed by ultra or micro filtration.

5 Claims, No Drawings

METHOD OF TREATMENT OF WASTE STREAMS OF OIL/WATER EMULSIONS OR SOLUTIONS

BACKGROUND OF THE INVENTION

This invention relates to a method of treating oil/water emulsions and solutions in waste streams by contacting the emulsion or solution with a salt, a synthetic polymer, flocculant and a demulsifying agent.

Numerous solutions have been proposed for the problem of disposing of waste water containing soluble or insoluble oils, oil-like substances and other organic impurities, for example, greases, soaps, and detergents, which may bing tightly with the water in an emulsions. These waste streams are often generated by factories, refineries, and even laundries and car washes. In addition to the aforementioned organic substances, the waste water may further contain heavy metals such as zinc, chromium, copper and cadmium. All of the aforementioned substances must be greatly reduced or essentially removed from the waste water before the water may be disposed of into the environment.

The solutions set forth in the prior art to the problem of disposing of the aforementioned impure waste water include various processes whereby substances are added to the waste water to cause the oil and the other impurities to resolve or be separated into a separate phase from the water so that the water may be easily separated from the impurities. The substances used in the prior art include various flocculants, both natural and synthetic, salts, such as calcium chloride, and demulsifying agents, such as sulfuric acid. However, these prior art processes themselves have numerous problems for example, their cost effectiveness, the adequacy of the separation and the complexity of the treatment process.

In addition to the above problems, where ultra or micro filtration is employed to purify oily waste water streams, the process of separation is often incomplete and, even worse, leaves the oily substances even more tightly bound in emulsion to the water. Consequently, the water output from ultra or micro filtration, referred to as "concentrates", are extremely high in water and contain tightly bound impurities. This is especially common with concentrates from commercial laundry waste streams which often contain solvents and strong detergents. These concentrates are quite expensive to dispose of, whether by incineration or other means.

Bearing in mind these and other problems of the prior art, it is an object of the present invention to provide an improved process for resolving or spliting oil/water emulsions and solutions.

It is another object of the present invention to provide a process for spliting tightly bound emulsion concentrates which are produced by ultra or micro filtration.

It is a further object of the present invention to provide a process for resolving oil/water emulsions and solutions which is easily operable, uses relatively low cost components, and produces a separate purified water phase.

SUMMARY OF THE INVENTION

The above and other objects which will be apparent to those skilled in the art are achieved in the present invention which is a process for treating an emulsion or solution of water and oil or the like comprising the steps of (a) contacting said emulsion or solution with an inorganic salt; (b) contacting said emulsion or solution with a synthetic polyelectrolyte flocculant; and, after steps (a) and (b), contacting said emulsion or solution with a demulsifying agent whereby said emulsion or solution is split into separate oil and water phases for subsequent separation. Preferably the salt is sodium chloride, the flocculant is an anionic synthetic flocculant having a molecular weight of six to eight million and a charge of three (3), and the demulsifying agent is sulfuric acid. The process may be used with emulsions or solutions which have previously been processed by ultra or micro filtration.

DETAILED DESCRIPTION OF THE INVENTION

The process of the present invention is normally employed in a batch system, that is, a given amount of waste water is treated at one time in a noncontinuous process until the water phase has been separated from the phase containing the oil and other impurities. The facility with which the present invention may be practiced enables it to be used to process batches of waste water of virtually any size from laboratory scale of one liter or less up to many thousands of gallons which may be required in commercial or industrial effluent treatment applications. Unless otherwise noted, the process is practiced at normal ambient conditions, i.e., room temperature (20° to 25° C.) and one atmosphere pressure.

The waste water which may be treated by the process of the present invention is any water which contains an oil or oil-like substance in an emulsion or solution. It is generally immaterial whether the water or the oil is the continuous phase of the emulsion. Where the so called "soluble oils" are present in significant amounts, the first two steps of the instant process are preferably practiced in reverse of the preferred order in which they are practiced for other oils and oil-like substances.

Because agitation is useful to disperse and mix the various substances during the steps of practicing the present invention, it is preferable to employ a container for the batch of waste water which contains agitation means. In the case of laboratory or small scale batches such agitation may simply be provided by stirring the water during treatment. In order to obtain the optimum results when treating non-soluble oils, it is necessary to add the three components of the present invention in the specific order of salt, flocculant, and demulsifier. Unlike the prior art which discloses the addition of less than all of these substances in various order, it has been found that this particular order of addition is preferable in order to obtain the best resolution or splitting of the non-soluble oil/water emulsion in the least amount of time. Where soluble oils are present in the oil/water emulsion or solution, it has been found that the flocculant should be added first, since it may be difficult to mix and dissolve in waste water containing dissolved salt. Following the flocculant addition, the salt and demulsifying agent are added in that order.

The salt which may be employed in the process of the present invention may be any suitable strongly ionic inorganic salt such as calcium chlroide, lithium chloride, calcium iodide or the like. Preferably the salt employed is sodium chloride since this salt is inexpensive and has yielded the best results. The amount of salt added and dissolved is preferably at least about 140 grams per liter of waste water and may be as high as the solubility limit for the particular waste water being treated. Good results have been obtained using about 230 grams of sodium chloride per liter of waste water. The salt is added to the waste water while stirring or otherwise agitating the waste water in order to place all of the salt into solution.

The flocculant added to and mixed with the waste water should be a snythetic polymer polyelectrolyte. Where the flocculant is to be added as the second step of the process, this may be done even before the salt itself slowly begins to cause the oil and water phases to split, a process known as "salting out". Good results have been obtained when using various types of non-ionic, anionic, and cationic polyelectrolytes. These polyelectrolytes are available in liquid or aaqueous form and may be pumped or fed into the batch of waste water and agitated therewith to disperse thepolyelectrolyte completely. The preferred minimum quantity of polyelectrolyte utilized is about 0.5 ml per liter of waste water, with about 1.5 milliliters per liter being typically used. There has been found no maximum amount of flocculant above which the process will not work, although for practical and economic reasons the amount of flocculant should not be so much that it ceases to be well dispersed.

Although a large variety of synthetic polyelectrolytes are known in the art, most are of a proprietary nature and their exact chemical structure is often not disclosed by the manufacturer. It has been found that a synthetic anionic polymer flocculant which is highly charged and of high molecular weight produces very favorable results. Such a flocculant is Nalco 7767, available from the Nalco Chemical Company of Oakbrook, Ill. and has a molecular weight of from about 6 million to 8 million and a charge of 3. During addition of the flocculant, there may occur some minor splitting of the water and oil phases.

To initiate the major resolution of the oil/water emulsion or solution into separare phases, a demulsifying agent is then added after the salt and flocculant have been mixed with the waste water. While good results have been obtained by utilizing a base as the demulsifier, it is preferred that a strong acid be employed since more favorable results have been obtained therewith. Suitable strong acids include various mineral acids such as sulfuric acid, or a strong organic acid, such as acetic acid. Sulfuric acid, 66 Baume, is preferred. The acid is preferably added in an amount of at least 5 milliliters per liter of waste water, with 15 milliliters per liter being typical.

The acidic demulsifying agent will generally start acting quickly after addition to the waste water batch to separate the oil and water phases. The batch should be continuously agitated during the addition of the demulsifier and some surface boiling may be expected when using sulfuric acid. Once the desired amount of demulsifying agent is added, the maximum amount of which may be determined by simple experimentation, the agitation is stopped to enable the oil and water phases to completely separate and become resolved.

Once the oil and water are resolved into separate phases, they may be individually drawn off and separated by conventional means.

In utilizing the preferred salt, flocculant and demulsifying agent listed above, it has been found that oil/water emulsions or solutions also containing chlorinated solvents and heavy metals may be separated so that essentially all of the chlorinated solvents and the vast majority of the heavy metals wind up in the oil phase. The water phase, aside from being somewhat high in sodium chloride, is pure enough to meet many applicable environmental regulations. On a laboratory scale it has been found that the separation occurs within about 60 to 90 seconds following the addition of the demulsifying agent for discharge into the environment. In other instances, further conventional treatment is employed, for example, by adding lime to reduce the metal and oil content.

The process of the present invention has been particularly useful in treating solutions, tight emulsions or concentrations produced after ultra or micro filtration. Such concentrates may contain relatively high amounts of water and have been insensitive to prior art treatments to separate the phases.

The present invention is not particularly sensitive to an overdose or excessively high concentration of any of the specific compounds added in the three steps, although some reduction in efficiency may occur. Naturally any overdose will lower the cost effectiveness of the process but the proper amounts to be employed can be readily determined by simple experimentation.

The following non-limiting examples are set forth below for purposes of illustration:

EXAMPLE I

An ultra filtration concentrate consisted of approximately 60% to 65% water, 35% to 40% oil/grease; 1.5% chlorinated solvents and heavy metals in excess of 1000 PPM. The concentrate also contained a large amount of detergents at an undetermined level.

This concentrate was split into 61% water phase and 39% oil phase. This was accomplished by the addition of:

1.9192 lbs of Sodium Chloride
0.0002 gallons of anionic flocculant Nalco 7767
0.02 gallons of 66 Baume Sulfuric Acid per gallon of concentrate in the order listed.

The split was extremely rapid with essentially all the chlorinated solvents ending up in the oil layer. The heavy metals ended up distributing themselves approximately 90% in the oil phase, and 10% in the water phase. The water phase was clear and contained about 376 ppm (parts per million) oil with only trace amounts (under 1 ppm) of each of the chlorinated solvents.

EXAMPLE II

A composite sample of mixed soluble oils and water was concentrated several times by ultra filtration into a tight emulsion. To 100 ml of this sample, the following was added, while stirring, in the given order:

2 ml—Nalco 7767
23 g—sodium chloride
2 ml—96% sulfuric acid

Following the mixing of the sulfuric acid, the agitation was stopped and the sample quickly split into an oil phase of 8.5 percent of the original sample and a water phase of 91.5 percent of the original sample. The water phase was visibly clear of oil impurity.

EXAMPLE III

A sample of typical concentrate produced by the ultra filtration unit of a commerical laundry was obtained. To 100 ml of this sample, the following was added, while stirring, in the given order:

23 g—sodium chloride
2 ml—Nalco 7767
2 ml—96% sulfuric acid

Following the mixing of the sulfuric acid, the agitation was stopped and the sample quickly split into separate oil and water phases, 35% and 65% respectively, based on the original sample. The water phase was visibly clear.

EXAMPLE IV

An emulsion containing water and a synthetic soluble oil, Trimsol (made by the Master Chemical Corp.) was produced. To 100 ml of this sample, the following was added, while stirring, in the following order:

2 ml—Nalco 7767
23 g—sodium chloride
2 ml—96% sulfuric acid

Following the mixing of the sulfuric acid, the stirring was stopped and the sample quickly split into separate phases of 4.6% oil and 95.4% water, based on the original sample. The water phase was visibly clear and free of visible impurities.

EXAMPLE V

An oil/water solution was produced by mixing a synthetic soluble oil, Luscon Polycool, with water. To 100 ml of this solution, the following was added, while stirring, in the stated order:

2 ml—Nalco 7767
23 g—sodium chloride
5 ml—96% sulfuric acid

Following the mixing of the sulfuric acid, the stirring was stopped and the sample quickly split into separate oil and water phases, 40% and 60% respectively, based on the original sample. The water phase was visibly clear and free of oil impurities.

Thus the present invention is shown through the above examples to be particularly useful in processing the water affluent ultra or micro filtration in a manner which permits the oils, solvents, and heavy metals to be almost completely removed from the water. Accordingly, the water may easily be disposed of by discharging into the environment in some instances and further minor treatment in others. The process leaves a considerably smaller fraction of oil and other wastes to be disposed of by conventional means.

While this invention has been described with references to specific embodiments it will be recognized by those skilled in the art that variations are possible without departing from the spririt and scope of the invention, and that it is intended to cover all changes and modifications of the invention disclosed herein for the purposes of illustration which do not constitute departure from the spirit and scope of the invention.

Having thus described the invention what is claimed is:

1. A process for treating an emulsion or solution of water and oil comprising the steps of:
   (a) contacting said emulsion or solution with sodium chloride in an amount of at least 140 g/l of emulsion or solution;
   (b) contacting said emulsion or solution with a synthetic anionic polyelectrolyte flocculant having a molecular weight of about six to eight million and a charge of 3 in an amount of at least 0.5 ml/l of emulsion or solution; and
   (c) after steps (a) and (b), contacting said emulsion or solution with a demulsifying agent comprising sulfuric acid in an amount of at least 5 ml/l of emulsion or solution to split said emulsion or solution into separate oil and water phases for subsequent separation.

2. The process of claim 1 wherein said contacting in steps (a), (b), and (c) are by respectively adding to said emulsion or solution said sodium chloride, flocculant, and acid while agitating said emulsion or solution, and wherein after step (c) said agitation is stopped to permit said emulsion or solution to split into separate oil and water phases.

3. The process of claim 2 wherein said emulsion or solution to be treated is processed by ultra- or micro-filtration prior to steps (a)–(c).

4. The process of claim 2 wherein step (a) is performed prior to step (b).

5. The process of claim 2 wherein step (b) is performed prior to step (a).

* * * * *

UNITED STATES PATENT AND TRADEMARK OFFICE
CERTIFICATE OF CORRECTION

PATENT NO. : 4,797,214

DATED : January 10, 1989

INVENTOR(S) : David C. Sevier

It is certified that error appears in the above-identified patent and that said Letters Patent is hereby corrected as shown below:

column 1, line 14 delete "bing" and substitute therefor --bind-- column 1, line 14 delete "emulsions" and substitute therefor --emulsion-- column 3, line 15 delete "aaqueous" and substitute therefor --aqueous-- column 3, line 17 delete "thepolyelectrolyte" and subsitute therfor --the polyelectrolyte-- column 3, line 39 delete "separare" and substitute therefor --separate--

Signed and Sealed this

Second Day of May, 1989

Attest:

DONALD J. QUIGG

*Attesting Officer*   Commissioner of Patents and Trademarks